(12) United States Patent
Anderson et al.

(10) Patent No.: US 7,827,548 B1
(45) Date of Patent: Nov. 2, 2010

(54) ENVIRONMENT-NEUTRAL APPLICATION BUILD

(75) Inventors: Woodrow N. Anderson, Wellsville, KS (US); William S. Anderson, Independence, MO (US); Charles L. Micklavzina, Overland Park, KS (US); Haidar Yousif, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1182 days.

(21) Appl. No.: 11/449,077

(22) Filed: Jun. 8, 2006

(51) Int. Cl.
*G06F 9/45* (2006.01)
(52) U.S. Cl. ............................................... 717/174
(58) Field of Classification Search .................. 717/174
See application file for complete search history.

(56) References Cited

U.S. PATENT DOCUMENTS 6,272,537 B1 * 8/2001 Kekic et al. ................. 709/223
7,266,817 B1 * 9/2007 Barrett ........................ 717/174
2002/0184610 A1 * 12/2002 Chong et al. ................ 717/109

* cited by examiner

*Primary Examiner*—John Chavis

(57) ABSTRACT

A computer implemented method for an environment-neutral application build is provided. The method includes installing an application build in a target environment of a set of target environments, wherein the application build includes a variable corresponding to each environment configuration parameter. The method also includes installing a configuration file of a set of configuration files in the target environment, wherein the configuration file includes an environment configuration value corresponding to each variable. Each configuration file of the set of configuration files corresponds to at least one target environment of the set of target environments. Furthermore, the method includes reading each environment configuration value from the configuration file. Additionally, the method includes writing each environment configuration value to the corresponding variable in the application build.

20 Claims, 5 Drawing Sheets

US 7,827,548 B1

ENVIRONMENT-NEUTRAL APPLICATION BUILD

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

An application is computer software that employs the capabilities of a computer to perform a task for a computer user. Applications include computer executable code that is "built" or derived from computer source code files. An application build may also include configuration files and support files for customizing the operation of the software.

While for simple programs the build process consists of a single file being compiled, for complex software the computer source code may consist of many files that may be configured in different ways to produce application versions customized specifically for each environment. The environment is the configuration of the hardware, operating system, and enabling programs in which an application build executes.

SUMMARY

In one embodiment, a computer implemented method for an environment-neutral application build is provided. The method includes installing an application build in a target environment of a set of target environments, wherein the application build includes a variable corresponding to each environment configuration parameter. The method also includes installing a configuration file of a set of configuration files in the target environment, wherein the configuration file includes an environment configuration value corresponding to each variable. Each configuration file of the set of configuration files corresponds to at least one target environment of the set of target environments. Furthermore, the method includes reading each environment configuration value from the configuration file. Additionally, the method includes writing each environment configuration value to the corresponding variable in the application build.

In another embodiment, a computer implemented system for an environment-neutral application build is provided. The system includes a complete application build, a configuration file, a deployment component, and a configuration component. The complete application build includes a variable corresponding to each environment configuration parameter. The configuration file includes an environment configuration value corresponding to each variable. The deployment component may install an application build update in a target environment by installing the complete application build in the target environment, and may install the configuration file in the target environment. The deployment component may also stop an old application build, move the old application build from a target directory to a backup directory, and move the complete application build from a staging directory to the target directory. The configuration component may read each environment configuration value from the configuration file and write each environment configuration value to the corresponding variable in the complete application build in the target directory.

In yet another embodiment, a computer implemented method for an environment-neutral application build is provided. The method includes creating an application build for a specific environment, wherein the application build includes an environment configuration value corresponding to each environment configuration parameter. The method also includes replacing each environment configuration value with a corresponding variable to create the environment-neutral application build. Furthermore, the method includes storing an environment configuration value for each corresponding variable in a configuration file.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Figure 1:
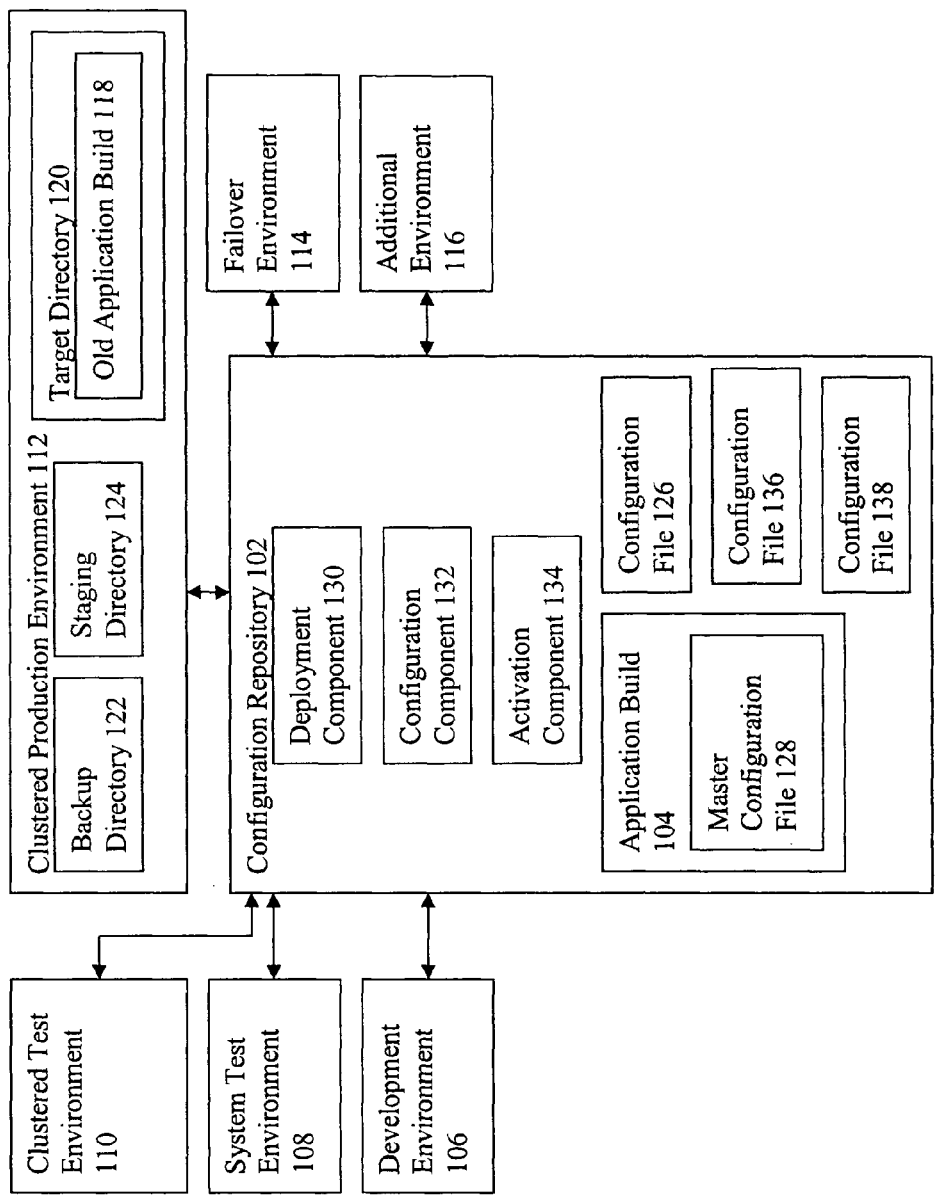
FIG. 1 illustrates an illustrative system suitable for implementing the several embodiments of the present disclosure.

It should be understood at the outset that although implementations of various embodiments of the present disclosure is described below, the present system may be implemented using any number of techniques, whether currently known or in existence. The present disclosure should in no way be limited to the implementations, drawings, and techniques described below, but may be modified within the scope of the appended claims along with their full scope of equivalents.

An application may be provided with different build configurations to run in different environments. Creating only one version of an application build for a specific environment results in the labor-intensive need to modify the version to create a new version for every other environment. Creating a new version of an application build for a specific environment may require more than a week of labor. Creating a different version of an application build for each anticipated environment is similarly labor intensive. Errors may occur during the long process of creating the new version of the application build, such as manually typing the number "1" instead of the letter "I" while transcribing large quantities of information.

Because of the labor-intensive natures of these approaches, both approaches are error-prone.

Another problem occurs when time lapses between the creations of each different version, because changes made to one version of an application build in a test environment may not be recorded to be made to another version of the application build that is created for a production environment. Comparing the version of an application build created for a test environment to the version an application build created for a production environment to determine if differences exist that are not environment-specific is expensive and time-consuming. While the code is supposed to be the same, an application build deployed in a production environment may be quite different from an application build that was tested in a test environment, resulting in greater deployment risks.

Embodiments of the present disclosure provide environment-neutral application builds. Only one environment-neutral application build is created, because an easily created environment-specific configuration file enables the environment-neutral application build to be installed, configured, and executed in every environment that can support the application build. The same code in an environment-neutral application build that is tested in a test environment is the same code that is deployed to a production environment. Creating a new version of a configuration file for an application build based on a specific environment may require only five minutes of labor. Furthermore, an environment-neutral application build for a test environment may be quickly compared using a checksum to an environment-neutral application build for a production environment to easily determine if differences exist that are not environment-specific.

Application build updates, i.e., small parts of an application build that are installed in an environment to correct or improve the application build, present a different problem. The process of determining which application build updates have been sent to which environments is expensive and time-consuming. Over time, these incremental application build updates may accumulate inconsistently across different environments. Furthermore, installing an application build update does not necessarily remove the old computer code that previously served the purpose now served by the application build update, because the old computer code may have been renamed or moved. Employees may decide to not remove the old computer code because the removal is time-consuming and the removal may damage the application build if not executed correctly. Often the old computer code still residing in an environment continues to execute after an application build update is installed. The old code also adds to the differences between application builds in each environment, resulting in specific differences that are difficult to identify.

Embodiments of the present disclosure install an application build update by installing a complete environment-neutral application build, thereby maintaining the same environment-neutral application build for every environment. The installation process does not change from environment to environment, or from application build update to application build update, because the complete environment-neutral application build is installed using the same process for every application build update for every environment. Embodiments of the present disclosure eliminate the old computer code problem by stopping an old application build, moving the old application build from a target directory to a backup directory, and moving the complete environment-neutral application build from a staging directory to the target directory. If the configuration or the execution of the complete environment-neutral application creates any problems, the old application build may be easily moved from the backup directory to the target directory and then may be executed.

Turning now to FIG. 1, an illustrative system for an environment-neutral application build is depicted. The system includes a configuration repository 102, which is a central place where an application build 104 may be stored. The system depicts that the configuration repository 102 may install the application build 104 in six environments: a development environment 106, a system test environment 108, a clustered test environment 110, a clustered production environment 112, a failover environment 114, and an additional environment 116. These six environments are shown for the purpose of an illustrative example only, as the configuration repository 102 may install the application build in any number of environments. The development environment 106 is the hardware, operating system, and enabling programs on which the application build 104 is created. The system test environment 108 is the hardware, operating system, and enabling programs on which the application build 104 is evaluated. The clustered test environment 110 is a clustered environment, which is the hardware, operating system, and enabling programs for a group of loosely coupled computers that work together closely on which the application build 104 is evaluated. In contrast to a clustered environment, a non-clustered environment is the hardware, operating system, and enabling programs for a single computer on which the application build 104 is evaluated, such as the system test environment 108. The clustered production environment 112 is the hardware, operating system, and enabling programs for a group of loosely coupled computers that work together closely on which the application build 104 is executed to achieve the goals of the application build 104. The failover environment 114 is the hardware, operating system, and enabling programs on which the application build 104 is executed upon the abnormal termination of a production environment, such as the clustered production environment 112. The additional environment 116 is the hardware, operating system, and enabling programs on which the application build 104 is executed that may be similar to any of the environments already described.

The system depicts that the clustered production environment 112 includes an old application build 118 for the purpose of an illustrative example only, as the clustered production environment 112 may include any number of applications. The old application build 118 is the result from the process of converting computer source code files to computer executable code for the software program or for the set of software programs currently or previously executing in the target environment. In contrast to the old application build, a new application build is the result from the process of converting computer source code files to computer executable code for the software program or for the set of software programs not yet executing in the target environment. An application build update is a small piece of computer code designed to improve or correct a software program or a set of software programs. In contrast to an application build update, a complete application build is all of the executable computer code with configuration and support files for an application.

The system depicts that the clustered production environment 112 may include three directories, a target directory 120, a backup directory 122, and a staging directory 124, for the purpose of an illustrative example only, as the clustered production environment 112 may include any number of directories. The target directory 120 is a file system from which the old application build 118 may be executed. Furthermore, if the application build 104 is installed in the target directory 120, the application build 104 may be executed from the target directory 120. The backup directory 122 is a file system where an additional copy of the old application 118 may be stored. The backup directory 122 is also a file system where an additional copy of the application build 104 may be stored. The staging directory 124 is a file system where the application build 104 may be initially installed.

The configuration repository 102 may also include a configuration file 126, a configuration file 136, and a configuration file 138, each of which is a collection of stored environment configuration parameters and environment-specific configuration values for a specific environment. Environment-specific configuration values may include an amount of memory, an operating system, a hostname, a target directory, an internet protocol address, a number of interfaces, names of interfaces, a number of threads, a heap size, connection pool settings, a user password, a sound card, a graphics connection, a logical identifier for a queue, ports and port numbers, and database library files. An environment configuration parameter is a symbol for a specific constructed aspect of the hardware, operating system, and enabling programs on which the application build 104 may be executed. An environment-specific configuration value, or an environment configuration value, is the setting for a specific constructed aspect of the hardware, operating system, and enabling programs on which the application build 104 may be executed. Because the application build 104 is separate from the configuration file 126, the configuration file 136, and the configuration file 138, the application build 104 is an environment-neutral application build, which is an application build that stores all environment-specific configuration values external to the application build 104. Furthermore, the application build 104 may include a master configuration file 128, which is a collection of stored environment parameters and default configuration values. A default configuration value, or a default environment configuration value, is a setting that is preset for a specific constructed aspect of the hardware, operating system, and enabling programs on which the application build 104 may be executed. If the application build 104 uses a value that is not present among the environment-specific values in the configuration file 126, the configuration file 136, or the configuration file 138, the application build 104 may use the corresponding configuration value in the master configuration file 128.

Additionally, the configuration repository 102 may include a deployment component 130, a configuration component 132, and an activation component 134. The deployment component 130 is an object that installs the application build 104 and a configuration file in a directory in an environment, such as the staging directory 124 in the clustered production environment 112. The deployment component may take the form of a script file, i.e., a sequence of operating system commands. The deployment component 130 may also move an old application build from a target directory to a backup directory, such as the old application build 118 from the target directory 120 to the backup directory 122. Additionally, the deployment component 130 may move an application build from a staging directory to a target directory, such as the application build 104 from the staging directory 124 to the target directory 120. A deployment process is the set of activities that may occur upon executing the deployment component 130.

The configuration component 132 is an object that constructs the application build 104 for a specific environment based on environment-specific values in a configuration file. A configuration process is the set of activities that may occur upon executing the configuration component 132. The activation component 134 is an object that may initiate execution of the application build 104 after the application build 104 is constructed for a specific environment based on environment specific values in a configuration file. Additionally, the activation component 134 is an object that may execute the deployment component 130 to install the application build 104 and a configuration file in a directory in an environment. Furthermore, the activation component 134 is an object that may execute the configuration component 132 after the deployment component 130 completes execution. An activation process is the set of activities that may occur upon executing the activation component 134. Before the application build 104 may be installed in any of the environments depicted in FIG. 1, the application build 104 is created as an environment-neutral application build.

Figure 2:
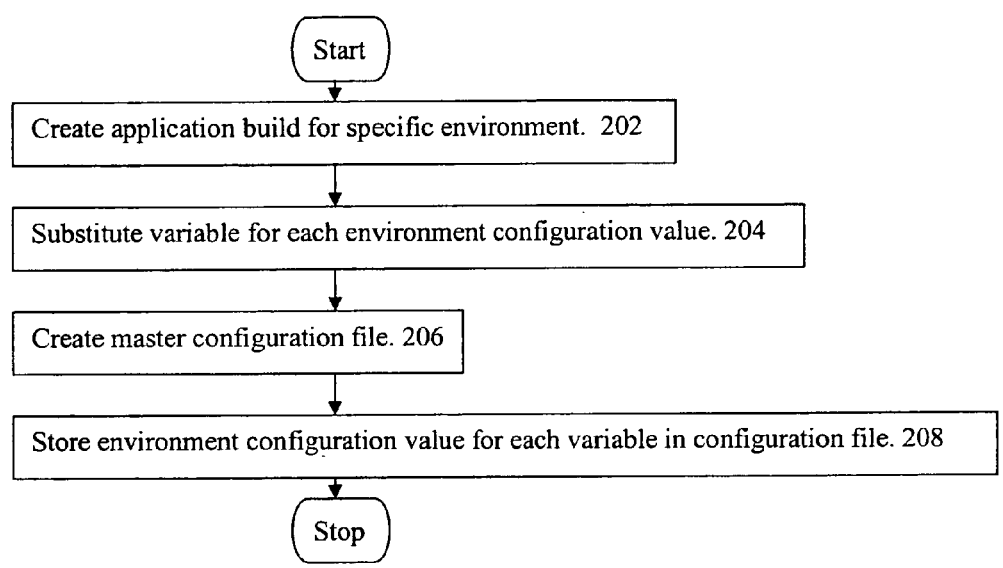
FIG. 2 is a flow chart of a method for creating an environment-neutral application build according to an embodiment of the present disclosure.

Turning now to FIG. 2, a flow chart of a method for creating an environment-neutral application build is depicted according to an embodiment of the present disclosure. In this method, a programmer first creates an environment-specific application build and then converts the environment-specific application build to an environment-neutral application build. Alternatively, if an environment-specific application build already exists, the programmer converts the environment-specific application build to an environment-neutral application build In box 202, a programmer creates an application build for a specific environment, wherein the application build includes an environment configuration value corresponding to each environment configuration parameter. The programmer may create an application build for a specific environment by writing computer source code files in languages such as C++ or Java and compiling the computer source code files to produce computer executable code with configuration and support files for the application build to be executed in a target environment. For example, the application build may include a file that enables the application build to access a database, such as the file database.properties. The file database.properties may include environment configuration parameters, such as database.hostname, the symbol for the host name of a database, and database.port, the symbol for a port of a database. The file database.properties includes two environment configuration parameters for the purpose of an illustrative example only, as any file may include any number of environment configuration parameters. The environment configuration parameter database.hostname may be equated with myappdb.prod.sprint.com, an environment-specific configuration value. Likewise, the environment configuration parameter database.port may be equated with 5124, another environment-specific configuration value. The file database.properties may include essentially the same environment configuration parameters for each environment, but the environment configuration values may be different for each environment. For example, the environment configuration parameter for a lightweight directory access protocol may be equated to an environment configuration value of directory.test.sprint.com in the system test environment 108 and may be equated to an environment configuration value of directory.prod.sprint.com in the clustered production environment 112.

In box 204, the programmer substitutes a variable, or "placeholder" for each environment configuration value to create an environment-neutral application build. A variable is an object that can assume any of a set of environment configuration values. For example, the programmer may substitute a variable, %DB-HOSTNAME%, for the environment configuration value myappdb.prod.sprint.com. In another example, the programmer may substitute another variable, %DB-PORT%, for the environment configuration value 5124. The examples illustrate the programmer substituting two variables for two environment configuration values for the purpose of an illustrative example only, as the programmer may substitute any number of variables for any number of environment configuration values.

In box 206, the programmer creates a master configuration file. For example, the programmer may create a master configuration file that includes an environment configuration parameter for the database hostname, with a variable, %DB-HOSTNAME%, equated to a default environment configuration value. In another example, the programmer may create a master configuration file that includes an environment configuration parameter for the database port, with another variable, %DB-PORT%, equated to another default environment configuration value. The examples illustrate the programmer creating a master configuration file that includes two environment configuration parameters, with two variables equated to two default environment configuration values for the purpose of an illustrative example only, as the programmer may create a master configuration file that includes any number of environment configuration values, with any number of variables equated to any number of default environment configuration values. The programmer does not include specific values in the master configuration file 128 because the master configuration file 128 includes only default environment configuration values, which are environment-neutral.

In box 208, the programmer stores an environment configuration value for each variable in a configuration file. Instead of storing environment-specific values in the environment-neutral application build 104, the environment-specific values are stored in a configuration file, which is separate from the application build 104. A programmer may create a configuration file for a target environment by making a copy of the master configuration file 128 and storing each environment-specific configuration value with its corresponding variable in place of the default environment configuration values. For example, the programmer stores the environment configuration value myappdb.prod.sprint.com for the variable %DB-HOSTNAME% in place of the default environment configuration value for a database hostname. In another example, the programmer stores the environment configuration value 5124 for the variable %DB-PORT% in place of the default environment configuration value for a database port.

For these examples, the file database.properties may now include environment configuration parameters, such as database.hostname, equated to the variable %DB-HOSTNAME%, and database.port, equated to the variable %DB-PORT%. At this point in the examples, the application build 104, which may include the file database.properties, is environment-neutral. The configuration file 126 may now include the environment-specific host name of a database, myappdb.prod.sprint.com, equated to the variable %DB-HOSTNAME%, and the environment-specific port of a database, 5124, equated to the variable, %DB-PORT%. The configuration component 132 may use the configuration file 126 to configure the application build 104, which includes the environment-neutral file database.properties, to enable the application build 104 to access a database. Before configuring the application build 104 to access a database, the deployment component 130 installs the application build 104 and a configuration file in a target environment.

Figure 3:
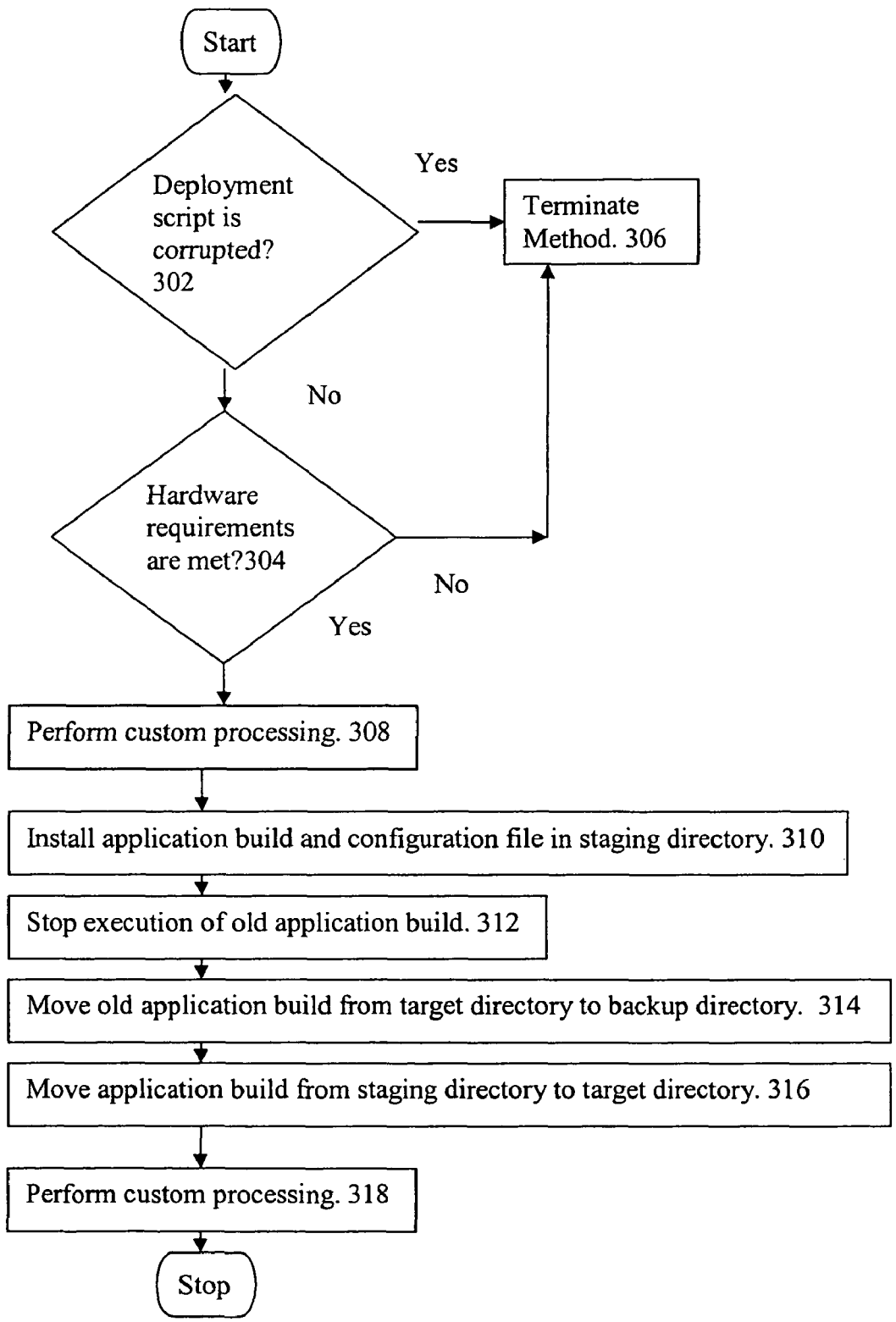
FIG. 3 is a flow chart of a method for a deployment component according to an embodiment of the present disclosure.

Turning now to FIG. 3, a flow chart of a method for the deployment component 130 is depicted according to an embodiment of the present disclosure. The descriptions for FIG. 3 use the clustered production environment 112, which includes the old application build 118, the target directory 120, the backup directory 122, and the staging directory 124 for the purpose of an illustrative example only, as any target environment may include an old application build, a target directory, a backup directory, and a staging directory. A target environment is the hardware, operating system, and enabling programs on which the application build 104 is installed for execution. For example, a target environment may include a server produced by Hewlett-Packard or Sun Microsystems. In another example, a target environment may include an operating system produced by Unix, Linux, or Microsoft. In yet another example, a target environment may include an enabling program such as a database management system produced by Oracle Corporation. The deployment component 130 is responsible for stopping the old application build 118 and moving the old application build 118 to the backup directory 122 so that the deployment component 130 may install the application build 104 in the target directory 120 in a target environment, such as the clustered production environment 112.

In box 302, the deployment component 130 determines whether the deployment script is corrupted. The deployment script is computer programming language for installing and moving application builds and configuration files. For example, the deployment component 130 may use a checksum to check the deployment script stored in the application build 104 to determine whether the deployment script is corrupted. In response to a determination that the deployment script is not corrupted, the method proceeds to box 304. In response to a determination that the deployment script is corrupted, the method proceeds to box 306.

In box 304, the deployment component 130 determines whether hardware requirements are met. The hardware requirements are the physical parts of a computer, including the digital circuitry, needed to install a configuration file and to install, configure, and execute the application build 104. For example, the deployment component 130 determines whether sufficient disk space exists in the clustered production environment 112 for installing the application build 104. In response to a determination that the hardware requirements are met, the method proceeds to box 308. In response to a determination that the hardware requirements are not met, the method proceeds to box 306.

In box 306, the deployment component 130 terminates the method. If the deployment script is corrupted or if the hardware requirements are not met, the deployment component 130 terminates the method. The deployment component 130 may inform a user who executed the deployment component 130 of the reason for terminating the method.

In box 308, the deployment component 100 performs custom processing. The custom processing is the additional set of activities required to install the application build 104 and a configuration file in a specific target environment. For example, the deployment component 130 may initialize user information files. In another example, the deployment component 130 may initialize the application build 104 based on the time zone of a target environment, such as the clustered production environment 112.

In box 310, the deployment component 130 installs the application build 104 and a configuration file in the staging directory 124. The staging directory is the location where the deployment component 130 installs the application build 104 and a configuration file in preparation for configuring the application build 104 for a target environment, such as the clustered production environment 112, based on environment-specific values in the configuration file 126.

In box 312, the deployment component 130 stops the execution of the old application build 118. The deployment component 130 stops the execution of the old application build 118 in preparation for the subsequent execution of the application build 104.

In box 314, the deployment component 130 moves the old application build 118 from the target directory 120 to the backup directory 122. The deployment component 130 moves the old application build 118 from the target directory 120 to the backup directory 122 to ensure a safe and expedient recovery for the old application build 118 if problems occur with configuring or executing the application build 104.

In box 316, the deployment component 130 moves the application build 104 from the staging directory 124 to the target directory 120. The deployment component 130 moves the application build 104 from the staging directory 124 to the target directory 120 to prepare the application build 104 for subsequent execution, which occurs from the target directory 120.

In box 318, the deployment component 100 performs custom processing. For example, the deployment component 130 may move environment-specific files that enable the application build 104 from the staging directory 124 to the target directory 120.

When the method depicted in FIG. 3 completes, the execution is stopped for the old application build 118, which is moved to the backup directory 122, and the application build 104 is installed in the target directory 120. At this point, the application build 104 is prepared for configuration.

Figure 4:
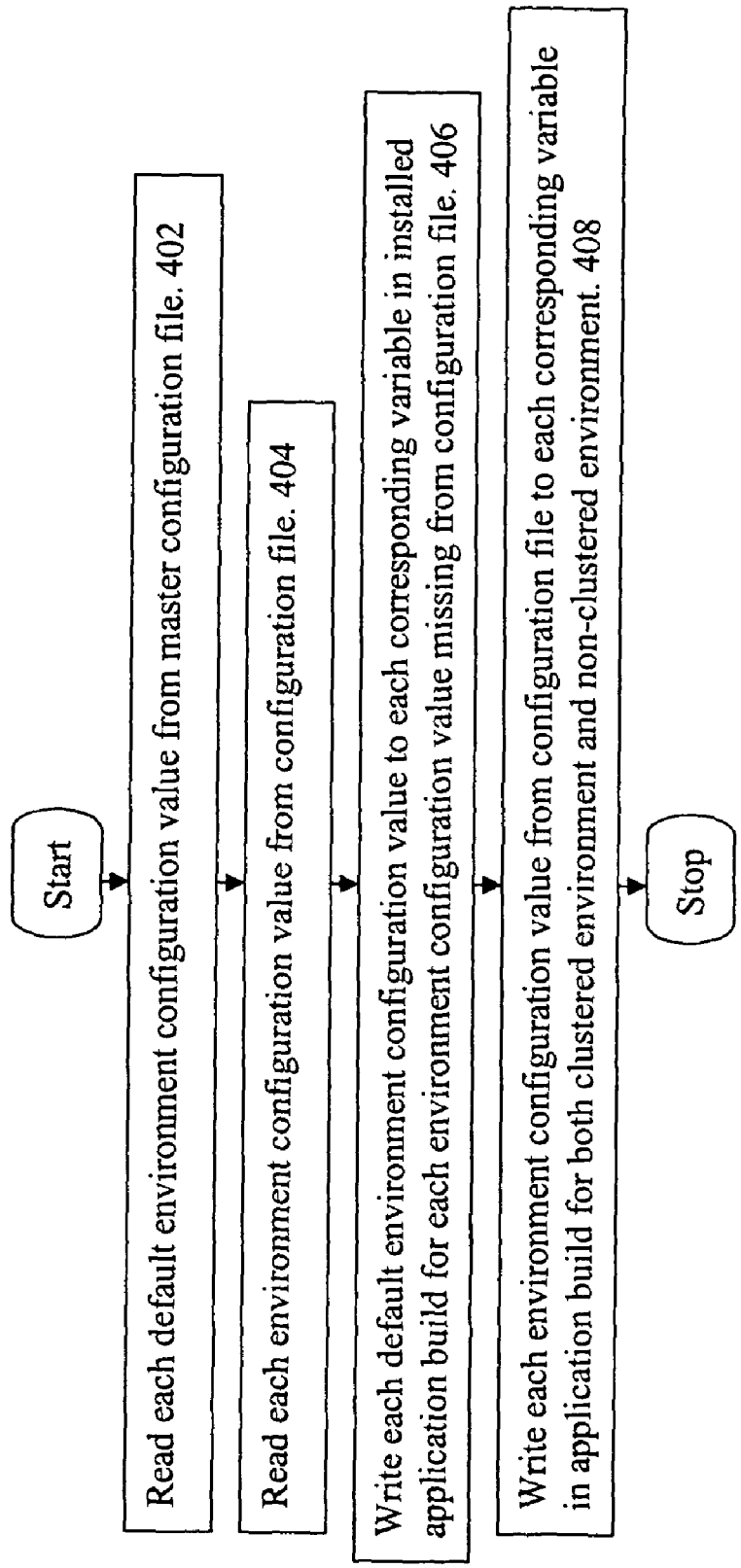
FIG. 4 is a flow chart of a method for a configuration component according to an embodiment of the present disclosure.

Turning now to FIG. 4, a flow chart of a method for the configuration component 132 is depicted according to an embodiment of the present disclosure. The configuration component 132 constructs the application build 104 for a specific environment based on environment-specific values in a configuration file. The application build 104 may include a file that enables the application build 104 to access a database, such as the file database.properties. The file database.properties may include environment configuration parameters, such as database.hostname, the symbol for the host name of a database, and database.port, the symbol for a port of a database. Because the environmental-neutral application build 104 may include the database.properties file, the environment configuration parameter database.hostname may be equated with a variable, %DB-HOSTNAME%, instead of an environment-specific value. Likewise, the environment configuration parameter database.port may be equated with a variable, %DB-PORT%, instead of an environment-specific value. Although the application build 104 includes the master configuration file 128, the master configuration file 128 includes only default environment configuration values, which are environment-neutral. Instead of storing environment-specific values in the environment-neutral application build 104, the environment-specific values may be stored in a configuration file, which is separate from the application build 104. A user may create a configuration file for a target environment by making a copy of the master configuration file 128 and modifying the default environment configuration values to environment-specific values for a target environment.

In box 402, the configuration component 132 reads each default environment configuration value from the master configuration file 128. The configuration component 132 may write a default environment configuration value to a corresponding variable in the application build 104 in the target environment if an environment configuration value is missing from a configuration file.

In box 404, the configuration component 132 reads each environment configuration value from a configuration file. For example, the configuration component 132 may read the environment configuration value myappdb.prod.sprint.com, equated to the variable %DB-HOSTNAME%, from the configuration file 126. In another example, the configuration component 132 may read the environment configuration value 5124, equated to the variable %DB-PORT%, from the configuration file 126. A different environment may use a similar configuration file that includes environment configuration values specific to the environment. The examples illustrate the configuration component 132 reading two environment configuration values equated to two variables for the purpose of an illustrative example only, as the configuration component 132 may read any number of environment configuration values equated to any number of variables.

In box 406, the configuration component 132 writes each default environment configuration value to each corresponding variable in the application build 104 in the target directory 120 for each environment configuration value missing from a configuration file. For example, the application build 104 may include an environment configuration parameter database.password, and this environment configuration password may be equated to a variable %DB-PASSWORD%, which may not be included in the configuration file 126. If a user modifies the application build 104, the user may not remember to modify the configuration file 126 to include the new environment configuration parameters required by the modified application build 104. For this example, the configuration component 132 writes the default environment configuration value for database.password from the master configuration file 128 to the corresponding variable %DB-PASSWORD% in the application build 104 in the target directory 120. The configuration component 132 may also send an error message to the user that executed the configuration component 132 to inform the user of the environment configuration value missing from the configuration file 126.

In box 408, the configuration component 132 writes each environment configuration value from a configuration file to each corresponding variable in the application build 104 in a target environment for both a clustered environment and a non-clustered environment. The configuration component 132 may write each environment configuration value to each corresponding variable in the application build 104 by using a search and replace method. For example, the configuration component 132 may write the environment configuration value myappdb.prod.sprint.com for the variable %DB-HOSTNAME% from the configuration file 126 to the corresponding variable %DB-HOSTNAME% in the application build 104 in the target directory 120 by searching for %DB-HOSTNAME% and replacing %DB-HOSTNAME% with myappdb.prod.sprint.com. In another example, the configuration component 132 may write the environment configuration value 5124 for the variable %DB-PORT% from the configuration file 126 to the corresponding variable %DB-PORT% in the application build 104 in the target directory 120. The examples illustrate the configuration component 132 writing two environment configuration values for two variables from the configuration file 126 to two corresponding variables in the application build 104 in the target directory 120 for the purpose of an illustrative example only, as the configuration component 132 may write any number of environment configuration values for any number of variables from any configuration file to any number of corresponding variables in the application build 104 in the target directory 120. For these examples, the file database.properties may now include environment configuration parameters, such as database.hostname, equated to the environment-specific host name of a database, myappdb.prod.sprint.com, and database.port, equated to an environment-specific port of a database, 5124. At this point in the examples, the application build 104 may include the environment-specific file database.properties that enables the application build 104 to access a database.

In box 408, the configuration component 132 writes each environment configuration value from a configuration file to each corresponding variable in the application build 104 in a target environment to enable the execution of the installed application build 104 for either a clustered environment or a non-clustered environment. The configuration component 132 writes each environment configuration value for both a clustered environment and a non-clustered environment to enable the execution of the installed application build 104 for either a clustered environment or a non-clustered environment. The configuration component 132 enables the application build 104 for both types of environments because at configuration time the configuration component 132 cannot determine whether the target environment is functioning as a clustered environment or as a non-clustered environment. At execution time, the activation component 134 examines a setting to determine whether a target environment is functioning as a clustered environment or a non-clustered environment. In response to a determination that the target environment is functioning as a clustered environment, the activation component 134 executes the application build 104 for a clustered environment. In response to a determination that the target environment is not functioning as a clustered environment, the activation component 134 executes the application build 104 for a non-clustered environment. Some target environments may be converted between a clustered environment and a non-clustered environment simply by activating a setting. Because the configuration component 132 configures the application build 104 for both types of environments, the activation component 134 may examine the setting at any time to switch the execution of the application build 104 between execution for a clustered environment and execution for a non-clustered environment. After the activation component determines the type of environment for the application build 104, the application build 104 is prepared for execution.

Figure 5:
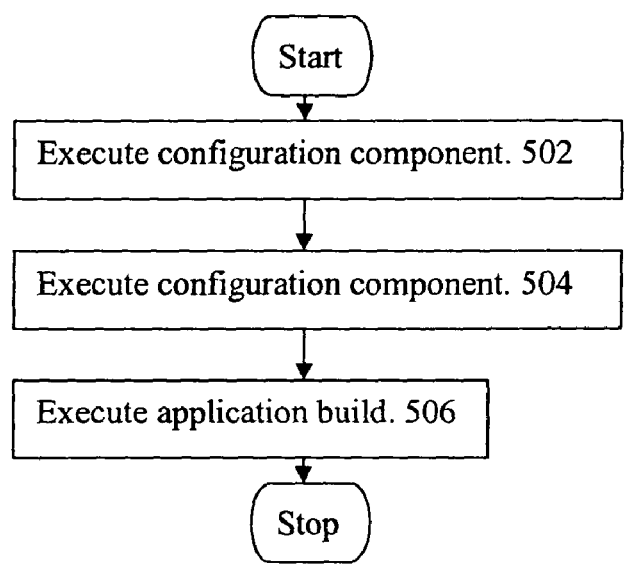
FIG. 5 is a flow chart of a method for an activation component according to an embodiment of the present disclosure.

Turning now to FIG. 5, a flow chart of a method for the activation component 100 is depicted according to an embodiment of the present disclosure. In box 502, the activation component 134 executes the deployment component 130. Although the deployment component 130 may be executed separately from the activation component 134 as a stand-alone procedure, the activation component 134 may execute the deployment component 130 in preparation for configuring the application build 104. In box 504, the activation component 134 executes the configuration component 132. Although the configuration component 132 may be executed separately from the activation component 134 as a stand-alone procedure, the activation component 134 may execute the configuration component 132 in preparation for executing the application build 104. The activation component 134 may execute the deployment component 130 only once to install the application build 104 and a configuration file in a target environment. In contrast to the deployment component 130, the activation component 134 may execute the configuration component 132 each time that a user modifies an environment configuration value in a configuration file. Each activation of the configuration component 132 configures the application build 104 for the target environment based on the environment configuration values in a configuration file. In box 506, the activation component 100 executes the application build 104, which is installed in the target directory 120 and configured to be environment-specific for the target environment, based on a configuration file.

Figure 6:
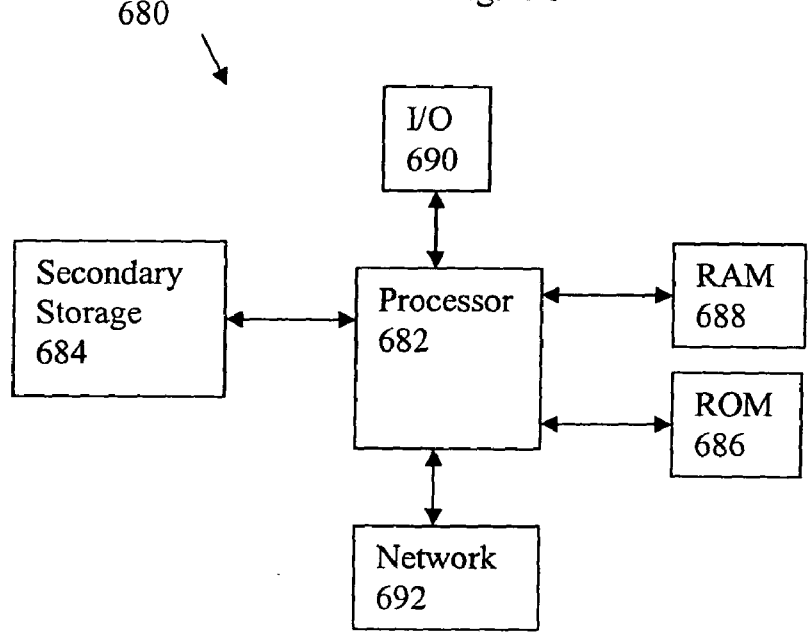
FIG. 6 illustrates an illustrative general purpose computer system suitable for implementing the several embodiments of the disclosure.

The system described above may be implemented on any general-purpose computer with sufficient processing power, memory resources, and network throughput capability to handle the necessary workload placed upon it. FIG. 6 illustrates a typical, general-purpose computer system suitable for implementing one or more embodiments disclosed herein. The computer system 680 includes a processor 682 (which may be referred to as a central processor unit or CPU) that is in communication with memory devices including secondary storage 684, read only memory (ROM) 686, random access memory (RAM) 688, input/output (I/O) 690 devices, and network connectivity devices 692. The processor may be implemented as one or more CPU chips.

The secondary storage 684 is typically comprised of one or more disk drives or tape drives and is used for non-volatile storage of data and as an over-flow data storage device if RAM 688 is not large enough to hold all working data. Secondary storage 684 may be used to store programs which are loaded into RAM 688 when such programs are selected for execution. The ROM 686 is used to store instructions and perhaps data which are read during program execution. ROM 686 is a non-volatile memory device which typically has a small memory capacity relative to the larger memory capacity of secondary storage. The RAM 688 is used to store volatile data and perhaps to store instructions. Access to both ROM 686 and RAM 688 is typically faster than to secondary storage 684.

I/O 690 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 692 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 692 devices may enable the processor 682 to communicate with an Internet or one or more intranets. With such a network connection, it is contemplated that the processor 682 might receive information from the network, or might output information to the network in the course of performing the above-described method steps. Such information, which is often represented as a sequence of instructions to be executed using processor 682, may be received from and outputted to the network, for example, in the form of a computer data signal embodied in a carrier wave Such information, which may include data or instructions to be executed using processor 682 for example, may be received from and outputted to the network, for example, in the form of a computer data baseband signal or signal embodied in a carrier wave. The baseband signal or signal embodied in the carrier wave generated by the network connectivity 692 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 682 executes instructions, codes, computer programs, scripts which it accesses from hard disk, floppy disk, optical disk (these various disk based systems may all be considered secondary storage 684), ROM 686, RAM 688, or the network connectivity devices 692.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A computer implemented method for an environment-neutral application build, comprising:
    installing an application build in a target environment of a set of target environments, wherein the application build comprises a variable corresponding to each environment configuration parameter;
    installing a configuration file of a set of configuration files in the target environment, wherein the configuration file comprises an environment configuration value corresponding to each variable and each configuration file of the set of configuration files corresponds to at least one target environment of the set of target environments;
    reading each environment configuration value from the configuration file; and
    writing each environment configuration value to a corresponding variable in the application build.

2. The computer implemented method of claim 1 further comprising:
    verifying that a deployment script is not corrupted;
    confirming that a hardware requirement is met; and
    performing custom processing.

3. The computer implemented method of claim 1 further comprising:
    automatically executing the application build.

4. The computer implemented method of claim 3 wherein writing each environment configuration value to the corresponding variable in the application build comprises writing each environment configuration value to the corresponding variable in the application build for both a clustered environment and a non-clustered environment; and
    wherein automatically executing the application build comprises automatically executing the application build for one of the clustered environment and the non-clustered environment.

5. The computer implemented method of claim 1 wherein the application build comprises a master configuration file.

6. The computer implemented method of claim 5 further comprising:
    reading each default environment configuration value from the master configuration file and writing each default environment configuration value to the corresponding variable in the application build for each environment configuration value missing from the configuration file.

7. A computer implemented system for an environment-neutral application build, comprising:
    a complete application build comprising a variable corresponding to each environment configuration parameter;
    a configuration file comprising an environment configuration value corresponding to each variable;
    a non-transitory computer readable medium comprising a deployment component operable to install an application build update in a target environment by installing the complete application build in the target environment,
    install the configuration file in the target environment,
    stop an old application build, and
    move the old application build from a target directory to a backup directory; and
    a non-transitory computer readable medium comprising a configuration component operable to read each environment configuration value from the configuration file and write each environment configuration value to a corresponding variable in the complete application build in the target directory.

8. The computer implemented system of claim 7 wherein the deployment component is further operable to:
    verify that a deployment script is not corrupted;
    confirm that a hardware requirement is met; and
    perform custom processing.

9. The computer implemented system of claim 7 further comprising:
    a non-transitory computer readable medium comprising an activation component operable to automatically execute the complete application build in the target directory.

10. The computer implemented system of claim 9 wherein the configuration component is further operable to:
    write each environment configuration value to the corresponding variable in the application build in the target directory for both a clustered environment and a non-clustered environment; and
    wherein the activation component is further operable to:
    automatically execute the complete application build in the target directory for one of the clustered environment and the non-clustered environment.

11. The computer implemented system of claim 7 wherein the complete application build comprises a master configuration file.

12. The computer implemented system of claim 11 wherein the configuration component is further operable to:
    read each default environment configuration value from the master configuration file; and
    write each default environment configuration value to the corresponding variable in the complete application build in the target directory for each environment configuration value missing from the configuration file.

13. A computer implemented method for an environment-neutral application build, comprising:
    creating an application build for a specific environment, wherein the application build comprises an environment configuration value corresponding to each environment configuration parameter;
    replacing each environment configuration value with a corresponding variable to create the environment-neutral application build; and storing an environment configuration value for each corresponding variable in a configuration file.

14. The computer implemented method of claim 13 further comprising:
   installing the environment-neutral application build in a target environment;
   installing the configuration file in the target environment;
   reading each environment configuration value from the configuration file; and
   writing each environment configuration value to the corresponding variable in the environment-neutral application build.

15. The computer implemented method of claim 14 further comprising:
   verifying that a deployment script is not corrupted;
   confirming that a hardware requirement is met; and
   performing custom processing.

16. The computer implemented method of claim 14 further comprising:
   stopping an old application build;
   moving the old application build from a target directory to a backup directory; and
   moving the environment-neutral application build from a staging directory to the target directory.

17. The computer implemented method of claim 14 further comprising:
   automatically executing the environment-neutral application build.

18. The computer implemented method of claim 17 wherein writing each environment configuration value to the corresponding variable in the environment-neutral application build comprises writing each environment configuration value to the corresponding variable in the environment-neutral application build for both a clustered environment and a non-clustered environment; and
   wherein automatically executing the environment-neutral application build comprises automatically executing the environment-neutral application build for one of the clustered environment and the non-clustered environment.

19. The computer implemented method of claim 14 wherein the environment-neutral application build comprises a master configuration file.

20. The computer implemented method of claim 19 further comprising:
   reading each default environment configuration value from the master configuration file and writing each default environment configuration value to the corresponding variable in the environment-neutral application build for each environment configuration value missing from the configuration file.

* * * * *